United States Patent
Kwak et al.

(10) Patent No.: US 7,912,031 B2
(45) Date of Patent: Mar. 22, 2011

(54) METHOD AND APPARATUS FOR SETTING GAIN FACTORS FOR DEDICATED PHYSICAL CHANNELS IN A MOBILE TELECOMMUNICATIONS SYSTEM

(75) Inventors: Yong-Jun Kwak, Yongin-si (KR); Ju-Ho Lee, Suwon-si (KR); Youn-Hyoung Heo, Suwon-si (KR); Young-Bum Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/423,224

(22) Filed: Apr. 14, 2009

(65) Prior Publication Data

US 2009/0196235 A1    Aug. 6, 2009

Related U.S. Application Data

(63) Continuation of application No. 11/347,397, filed on Feb. 6, 2006.

(30) Foreign Application Priority Data

Feb. 4, 2005  (KR) .......................... 10-2005-0010870

(51) Int. Cl.
    *H04B 7/216*  (2006.01)
(52) U.S. Cl. .................................... 370/342; 455/522
(58) Field of Classification Search .................. None
    See application file for complete search history.

(56) References Cited

U.S. PATENT DOCUMENTS

2002/0075943 A1 *   6/2002  Kurihara ................. 375/146
2006/0034226 A1 *   2/2006  Gu et al. ................. 370/332

FOREIGN PATENT DOCUMENTS

| EP | 1089458 A2 | 4/2001 |
| EP | 1089458 A3 | 8/2001 |
| WO | WO 02/052757 A1 | 7/2002 |

OTHER PUBLICATIONS

Motorola, "Setting of Gain Factors for Enhanced Uplink," TSG-RAN WGI Meeting #39, Nov. 15, 2004, pp. 1-5, Shin-Yokohama, Japan.
Motorola, "3rd Generation Partnership Project; Technical Specification Group Radio Access Network; Physical Layer Procedures (FDD)(Release 6)," GPP TS 25.214 V6.4.0; Jan. 5, 2005, pp. 20-22.
Samsung, "EUL physical channel code mapping," TSG-RAN WGI Meeting #39, Nov. 15, 2004, pp. 1-11, Shin-Yokohama, Japan.
Samsung, 3GPP TS25.213 V6.1.0 "3rd Generation Partnership Project; Technical Specification Group Radio Access Network; Spreading and Modulation (FDD) (Release 6)," GPP TS 25.213 V6.1.0 (Dec. 2004) Jan. 5, 2005, pp. 8-11.

* cited by examiner

*Primary Examiner* — Phuoc Doan
(74) *Attorney, Agent, or Firm* — Roylance, Abrams, Berdo and Goodman L.L.P.

(57) ABSTRACT

An apparatus and method are provided for setting gain factors for dedicated physical channels in a mobile communication system. The UE receives configuration information indicating uplink dedicated physical channel configuration. The UE sets a gain factor of a dedicated physical control channel (DPCCH) to 1 in the case that no DPDCH is configured. The UE calculates a gain factor of a enhanced dedicated physical control channel (E-DPCCH) using the gain factor of the DPCCH.

20 Claims, 8 Drawing Sheets

METHOD AND APPARATUS FOR SETTING GAIN FACTORS FOR DEDICATED PHYSICAL CHANNELS IN A MOBILE TELECOMMUNICATIONS SYSTEM

CROSS-REFERENCE TO RELATED APPLICATIONS

This application claims the benefit under 35 U.S.C. §119 (a) of Korean Patent Application No. 10-2005-0010870 entitled "Method and Apparatus for Setting Gain Factors for Dedicated Physical Channels in a Mobile Telecommunications System" filed at the Korean Intellectual Property Office on Feb. 4, 2005, and the benefit under 35 U.S.C. §120 as a continuation of U.S. patent application Ser. No. 11/347,397 entitled "Method and Apparatus for Setting Gain Factors for Dedicated Physical Channels in a Mobile Telecommunications System" filed at the U.S. Patent and Trademark Office on Feb. 6, 2006, the entire disclosures of which are herein incorporated by reference.

BACKGROUND OF THE INVENTION

1. Field of the Invention

The present invention relates generally to asynchronous Wideband Code Division Multiple Access (WCDMA) communications. In particular, the present invention relates to a method of setting a gain factor representing a power variable for uplink packet transmission.

2. Description of the Related Art

As a $3^{rd}$ generation mobile communication system using WCDMA based on the European Global System for Mobile communications (GSM) system, Universal Mobile Telecommunication Service (UMTS) provides mobile subscribers or computer users with a uniform service of transmitting packet-based text, digitized voice, and video and multimedia data at or above 2 Mbps, irrespective of their locations around the world. With the introduction of the concept of virtual access, the UMTS system allows access to any end point within a network all the time. This virtual access refers to packet-switched access using a packet protocol like Internet Protocol (IP).

Figure 1:
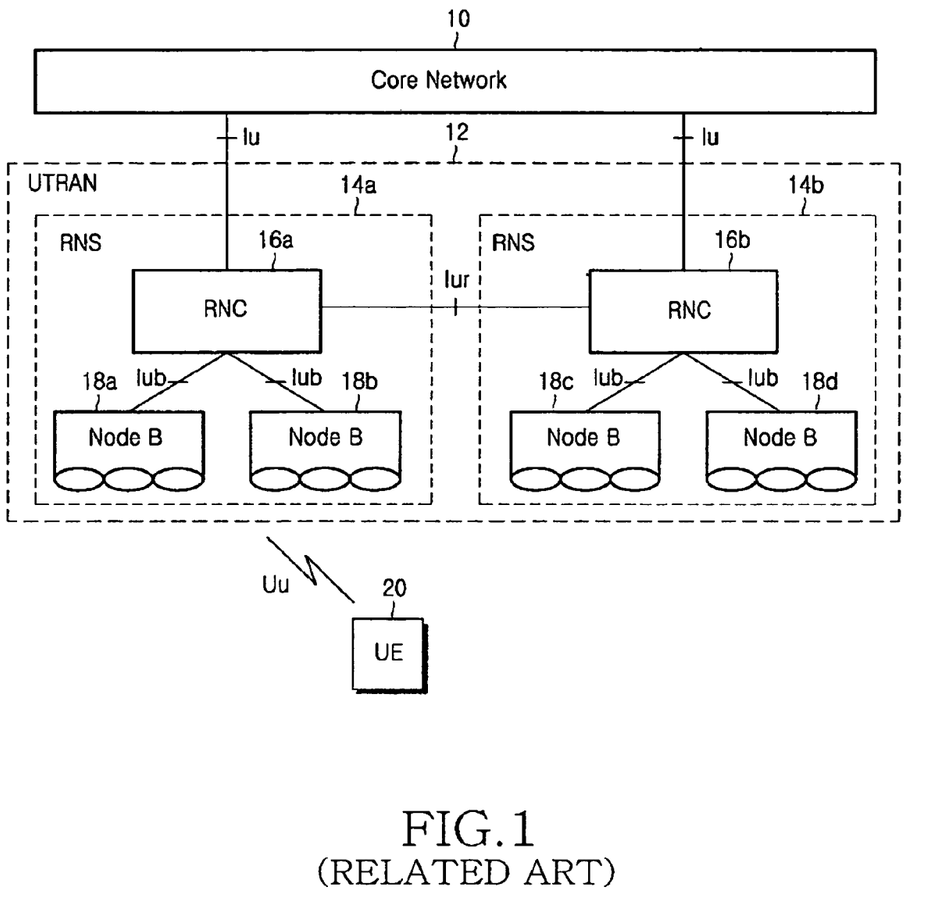
FIG. 1 illustrates the configuration of an exemplary UTRAN in a typical UMTS system.

FIG. 1 illustrates the configuration of an exemplary UMTS Terrestrial Radio Access Network (UTRAN) in a typical UMTS system.

Referring to FIG. 1, a UTRAN 12 comprises Radio Network Controllers (RNCs) 16a and 16b and Node Bs 18a to 18d, and connects a User Equipment (UE) 20 to a Core Network (CN) 10. A plurality of cells may underlie the Node Bs 18a to 18d. Each RNC 16a or 16b controls its underlying Node Bs, and each Node B controls its underlying cells. An RNC, and Node Bs and cells under the control of the RNC, collectively form a Radio Network Subsystem (RNS) 14a or 14b.

The RNCs 16a and 16b each allocate or manage radio resources to the Node Bs 18a to 18d under their control, and the Node Bs 18a to 18d function to actually provide the radio resources. The radio resources are configured on a cell basis, and the radio resources provided by the Node Bs 18a to 18d refer to radio resources of the cells that they manage. The UE 20 establishes a radio channel using radio resources provided by a particular cell under a particular Node B, for communications. From the UE's point of view, a distinction between the Node Bs 18a to 18d and their controlled cells is of little importance, and the UE 20 deals only with a physical layer configured on a cell basis. Therefore, the terms "Node B" and "cell" are interchangeably used herein.

A Uu interface is defined between a UE and an RNC. The hierarchical protocol architecture of an exemplary Uu interface is illustrated in detail in FIG. 2. This interface is divided into a control plane (C-plane) 30 for exchanging control signals between the UE and the RNC, and a user plane (U-plane) 32 for transmitting actual data.

Figure 2:
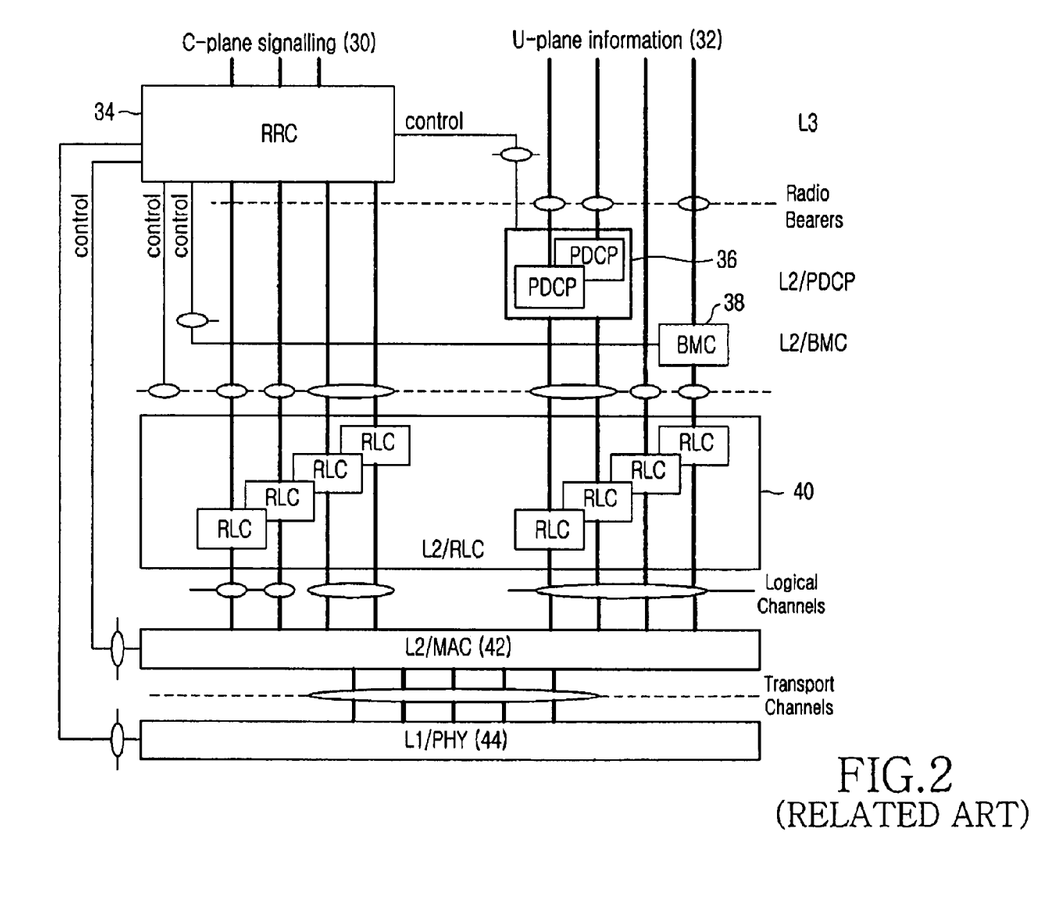
FIG. 2 illustrates the hierarchical architecture of an exemplary interface defined between a UE and an RNC of FIG. 1.

Referring to FIG. 2, a C-plane signal is processed in a Radio Resource Control (RRC) layer 34, a Radio Link Control (RLC) layer 40, a Medium Access Control (MAC) layer 42, and a physical (PHY) layer 44. A U-plane signal is processed in a Packet Data Control Protocol (PDCP) layer 36, a Broadcast/Multicast Control (BMC) layer 38, the RLC layer 40, the MAC layer 42, and the PHY layer 44. The PHY layer 44 resides in each cell, and the MAC layer 42 through the RRC layer 34 are usually configured in each RNC.

The PHY layer 44 provides an information delivery service by a radio transfer technology, corresponding to Layer 1 (L1) in an Open System Interconnection (OSI) model. The PHY layer 44 is connected to the MAC layer 42 via transport channels. The mapping relationship between the transport channels and physical channels is determined according to how data is processed in the PHY layer 44.

The MAC layer 42 is connected to the RLC layer 40 via logical channels. The MAC layer 42 delivers data received from the RLC layer 40 on the logical channels to the PHY layer 44 on appropriate transport channels, and delivers data received from the PHY layer 44 on the transport channels to the RLC layer 40 on appropriate logical channels. The MAC layer 42 inserts additional information or interprets inserted data in data received on the logical channels, and controls random access. A U-plane part is called MAC-data (MAC-d) and a C-plane part is called MAC-control (MAC-c) in the MAC layer 42.

The RLC layer 40 controls the establishment and release of the logical channels. The RLC layer 40 operates in one of an Acknowledged Mode (AM), an Unacknowledged Mode (UM), and a Transparent Mode (TM), and provides different functionalities in each mode. Typically, the RLC layer 40 segments or concatenates Service Data Units (SDUs) received from an upper layer to an appropriate size, and corrects errors.

The PDCP layer 36 resides above the RLC layer 40 in the U-plane 32. The PDCP layer 36 is responsible for compression and decompression of the header of data carried in the form of an IP packet and data delivery with integrity in the case where a serving RNC is changed due to the UE's mobility.

The characteristics of the transport channels that connect the PHY layer 44 to the upper layers depend on a Transport Format (TF) that defines PHY layer processes, including convolutional channel encoding, interleaving, and service-specific rate matching.

Particularly, the UMTS system uses the Enhanced Uplink Dedicated CHannel (E-DCH) with the aim to further improve packet transmission performance on the uplink from UEs to a Node B. The E-DCH is enhanced from the legacy DCH. To support more stable high-speed data transmission, the E-DCH utilizes Hybrid Automatic Retransmission request (HARQ) and Node B-controlled scheduling.

Figure 3:
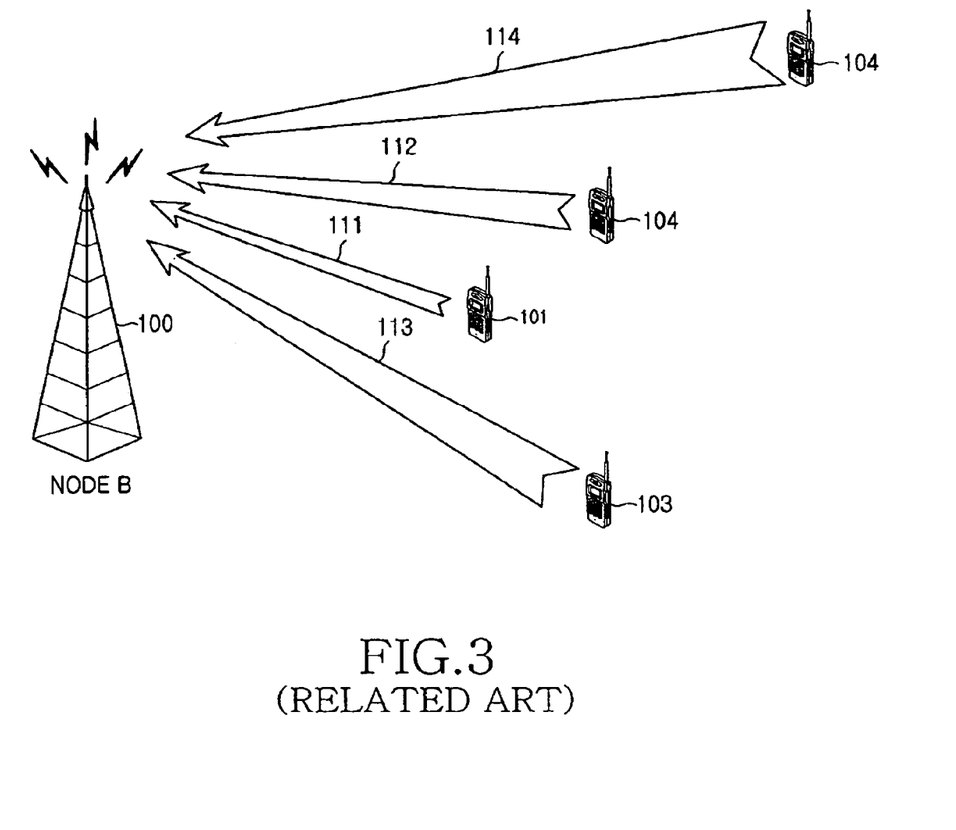
FIG. 3 illustrates a typical E-DCH transmission via a radio link.

FIG. 3 illustrates a typical data transmission on the E-DCH via radio links. Reference numeral 100 denotes a Node B supporting the E-DCH and reference numerals 101 to 104 denote UEs that transmit the E-DCH.

Referring to FIG. 3, the Node B 100 evaluates the channel status of the UEs 101 to 104, and schedules their uplink data transmissions based on the channel status of each. The scheduling is performed such that a noise rise measurement does not exceed a target noise rise in the Node B 100 in order to increase total system performance. Therefore, the Node B 100 allocates a low data rate to a remote UE 104 and a high data rate to a nearby UE 101.

Figure 4:
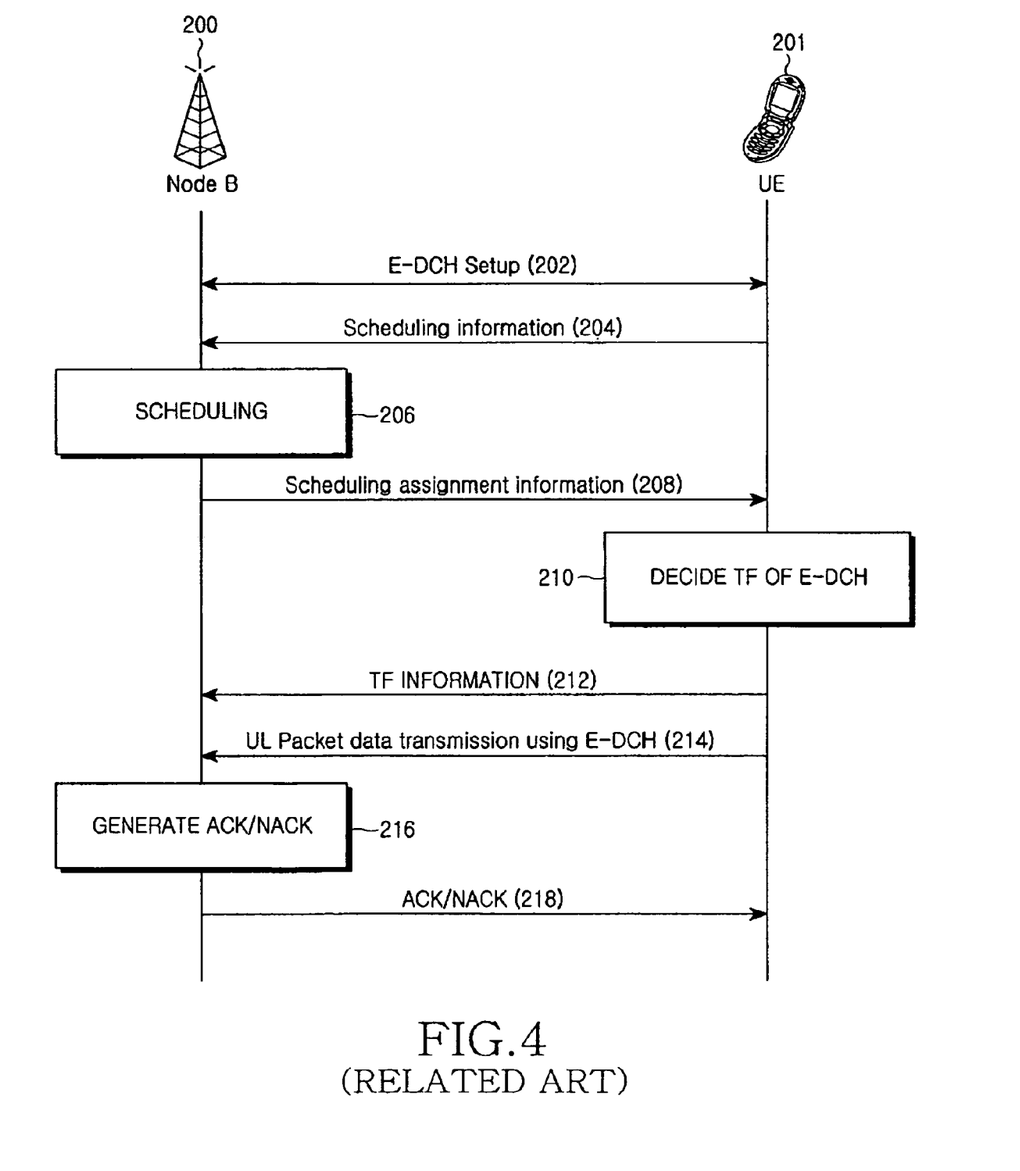
FIG. 4 is a diagram illustrating a typical signal flow for message transmission/reception on an E-DCH.

FIG. 4 is a diagram illustrating a typical signal flow for message transmission on the E-DCH.

Referring to FIG. 4, a Node B 200 and a UE 201 establish an E-DCH in step 202. Step 202 involves message transmission on dedicated transport channels. The UE 201 transmits its UE status information to the Node B 200 in step 204. The UE 201 status information may contain uplink channel status information represented by the transmit power and power margin of the UE 201, and the amount of buffered data to be transmitted to the Node B 200.

In step 206, the Node B 200 monitors UE status information from a plurality of UEs to schedule uplink data transmissions for the individual UEs. The Node B 200 can decide to approve an uplink packet transmission from the UE 201 and then transmit scheduling assignment information to the UE 201 in step 208. The scheduling assignment information includes an allowed data rate and an allowed timing.

In step 210, the UE 201 determines the TF of the E-DCH based on the scheduling assignment information. The UE 201 then transmits to the Node B 200 TF information, that is, a Transport Format Resource Indicator (TFRI) and uplink packet data, on the E-DCH at the same time in steps 212 and 214. The Node B 200 then determines whether the TFRI and the uplink packet data have errors in step 216. In the absence of errors in both, the Node B 200 transmits an ACKnowledgement (ACK) signal to the UE 201, whereas in the presence of errors in either of the TFRI and the uplink packet data, the Node B 200 transmits a Non-ACKnowledgement (NACK) signal to the UE 201 in step 218.

In the former case, the packet data transmission is completed and the UE 201 transmits new packet data to the Node B 200 on the E-DCH. However, in the latter case, the UE 201 retransmits the same packet data to the Node B 200 on the E-DCH.

Compared to the legacy DCH, the E-DCH operated as described above supports Adaptive Modulation and Coding (AMC), HARQ, Node B-controlled scheduling, and shorter Transmission Time Interval (TTI), in order to support more stable, high-speed data transmission.

Uplink dedicated physical channels include a Dedicated Physical Data CHannel (DPDCH) to which the legacy DCH is mapped, a Dedicated Physical Control CHannel (DPCCH) for delivering control information associated with the DPDCH, a High Speed DPCCH (HS-DPCCH) for delivering uplink control information associated with High Speed Downlink Packet Access (HSDPA), an Enhanced DPDCH (E-DPDCH) to which the E-DCH is mapped, and an Enhanced DPCCH (E-DPCCH) for delivering control information associated with the E-DPDCH.

Traditionally, the transmit power of the E-DPDCH is decided relative to that of the DPCCH. The DPCCH is a criterion by which the transmit power of all other uplink dedicated physical channels is decided. The E-DCH can be sent along with the legacy DCH, or independently without the legacy DCH. The latter is called a stand-alone E-DCH. When the stand-alone E-DCH is used, the DPDCH to which the DCH is mapped, does not exist in the PHY layer.

Accordingly, a need exists for a system and method for determining the transmit power of the stand-alone E-DCH.

SUMMARY OF THE INVENTION

An object of embodiments of the present invention is to substantially solve at least the above problems and/or disadvantages, and to provide at least the advantages below. Accordingly, embodiments of the present invention provide a method and apparatus for determining the transmit power of enhanced dedicated physical channels in an asynchronous WCDMA communication system.

Embodiments of the present invention provide a method and apparatus for enabling a UE to set the transmit power of enhanced dedicated physical channels even when the DCH is not established.

Embodiments of the present invention also provide a signaling method and apparatus for setting a gain factor for determining the transmit power of a UE in a different manner, depending on whether the DCH is established or not.

According to one aspect of embodiments of the present invention, a method is provided for setting gain factors, by a UE, for uplink transmission in a mobile communication system. The method comprises receiving configuration information indicating uplink dedicated physical channel configuration. A gain factor of a dedicated physical control channel (DPCCH) is set to 1 in the case that no DPDCH is configured. A gain factor of a enhanced dedicated physical control channel (E-DPCCH) is calculated using the gain factor of the DPCCH.

According to another aspect of embodiments of the present invention, an apparatus is provided for setting gain factors for dedicated physical channels in a mobile communication system. The apparatus further comprises a receiver for receiving configuration information for establishing dedicated physical channels. The apparatus further comprises a controller for setting the gain factor of a dedicated physical control channel (DPCCH) to 1, in the case that no DPDCH is configured, and calculating a gain factor of a enhanced dedicated physical control channel (E-DPCCH) using the gain factor of the DPCCH. The apparatus further comprises a transmitter for sending information on the E-DPCCH with a transmit power corresponding to the calculated gain factor.

BRIEF DESCRIPTION OF THE DRAWINGS

The above and other objects, features and advantages of embodiments of the present invention will become more apparent from the following detailed description when taken in conjunction with the accompanying drawings, in which.

Throughout the drawings, like reference numerals will be understood to refer to like parts, components and structures.

DETAILED DESCRIPTION OF THE EXEMPLARY EMBODIMENTS

A number of exemplary embodiments of the present invention will be described herein below with reference to the accompanying drawings. In the following description, well-known functions or constructions are not described in detail since they would obscure the invention in unnecessary detail.

A main feature of embodiments of the present invention is that the transmit power of physical channels related to the stand-alone E-DCH is set in a different manner, depending on whether the DCH is established or not. Particularly, the transmit power of physical channels for carrying the E-DCH, i.e. the E-DPDCH and the E-DPCCH, is set in a WCDMA communication system using the E-DCH.

Figure 5:
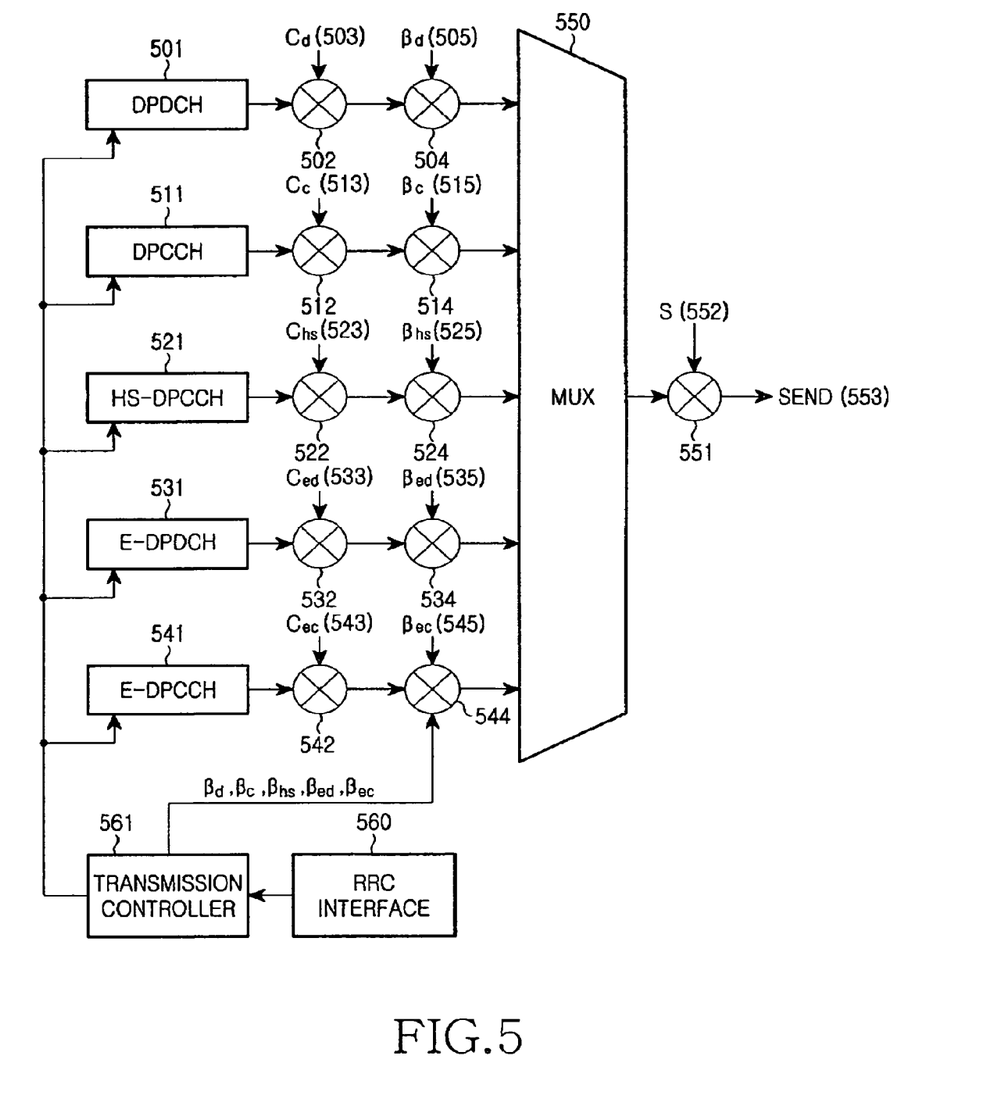
FIG. 5 is a block diagram of an exemplary transmitter for multiplexing uplink dedicated physical channels in a UE supporting the E-DCH according to an embodiment of the present invention.

FIG. 5 is a block diagram of an exemplary transmitter for multiplexing uplink dedicated physical channels in a UE supporting the E-DCH according to an embodiment of the present invention.

Referring to FIG. 5, an RRC interface 560 receives from an RNC by RRC signaling, TFCs available for uplink dedicated channels and variables necessary to calculate gain factors for uplink dedicated physical channels, as channel configuration information required for establishing the uplink dedicated channels, and provides the TFCs to a transmission controller 561. The transmission controller 561 selects appropriate TFCs for the individual uplink dedicated physical channels, the DPDCH, DPCCH, HS-DPCCH, E-DPDCH and E-DPCCH among the received TFCs, provides the TFCs to corresponding physical channel generators 501, 511, 521, 531, and 541, respectively, and also provides gain factors 505, 515, 525, 535, and 545 to corresponding gain controllers 504, 514, 524, 534, and 544, respectively.

The DPDCH data generated from the DPDCH generator 501 is spread with a spreading code $C_d$ 503 in a spreader 502, multiplied by the DPDCH gain factor $\beta_d$ 505 in the gain controller 504, and provided to a multiplexer (MUX) 550. The DPCCH data generated from the DPCCH generator 511 is spread with a spreading code $C_c$ 513 in a spreader 512, multiplied by the DPCCH gain factor $\beta_c$ 515 in the gain controller 514, and provided to the MUX 550.

The HS-DPCCH data generated from the HS-DPCCH generator 521 is spread with a spreading code $C_{hs}$ 523 in a spreader 522, multiplied by the HS-DPCCH gain factor $\beta_{hs}$ 525 in the gain controller 524, and provided to the MUX 550. The E-DPDCH data generated from the E-DPDCH generator 531 is spread with a spreading code $C_{ed}$ 533 in a spreader 532, multiplied by the E-DPDCH gain factor $\beta_{ed}$ 535 in the gain controller 534, and provided to the MUX 550. The E-DPCCH data generated from the E-DPCCH generator 541 is spread with a spreading code $C_{ec}$ 543 in a spreader 542, multiplied by the E-DPCCH gain factor $\beta_{ec}$ 545 in the gain controller 544, and provided to the MUX 550.

Due to the orthogonal spreading codes 503, 513, 523, 533, and 543, the spread physical channel signals are orthogonal and multiplexed (summed) in the MUX 550. The multiplexed physical channel signal is scrambled with a scrambling code S 552 in a scrambler 551, and the resulting spread signal having randomness is sent as indicated by reference numeral 553.

The gain factors 505, 515, 525, 535, and 545 for the physical channels are preferably set as follows.

Simultaneously with establishing the DCH, the RNC sets the gain factor $\beta_d$ for the DPDCH and $\beta_c$ for the DPCCH for each TFC, and provides them to the UE and the Node B. The UE sets the transmit power of the DPDCH and the DPCCH based on the ratio of $\beta_d$ to $\beta_c$.

For the HS-DPCCH, the E-DPDCH and the E-DPCCH, however, the RNC signals offsets relative to $\beta_c$ to the UE, rather than $\beta_{hs}$, $\beta_{ed}$, and $\beta_{ec}$. To illustrate further, the HS-DPCCH offsets for an HS-DPCCH slot delivering an ACK or NACK as HARQ information and an HS-DPCCH delivering Channel Quality Information (CQI), can be denoted by $\Delta_{ACK}$, $\Delta_{NACK}$ and $\Delta_{CQI}$, respectively. Then, $\beta_{hs}$ is calculated using the offset values as shown by the following Equation (1), $$\beta_{hs} = \beta_c \times 10^{\left(\frac{\Delta_{HS-DPCCH}}{20}\right)} \qquad (1)$$

wherein, $\Delta_{HS-DPCCH}$ for the ACK/NACK slot is given as, $\Delta_{HS-DPCCH} = \Delta_{ACK}$ (if HARQ information is an ACK);
$\Delta_{HS-DPCCH} = \Delta_{NACK}$ (if HARQ information is an NACK); and
$\Delta_{HS-DPCCH}$ = the greater value between $\Delta_{ACK}$ and $\Delta_{NACK}$ (if HARQ information is PRE or POST).

As used above, PRE or POST represents the start or end of an ACK/NACK transmission as HARQ information. Accordingly, $\Delta_{HS-DPCCH}$ for the CQI slot is given as, $\Delta_{HS-DPCCH} = \Delta_{CQI}$.

Offsets related to the TF of the E-DCH, $\Delta_{E-DPDCH}$, and $\Delta_{E-DPCCH}$, are used in setting the power of the E-DPDCH and the E-DPCCH. The $\Delta_{E-DPDCH}$ and $\Delta_{E-DPCCH}$ may be signaled from the RNC to the UE, or computed according to an arbitrary criterion and a pre-defined formula in the UE. The $\beta_{ed}$ and $\beta_{ec}$ are computed by the following Equation (2), $$\beta_{ed} = \beta_c \times 10^{\left(\frac{\Delta_{E-DPDCH}}{20}\right)} \qquad (2)$$
$$\beta_{ec} = \beta_c \times 10^{\left(\frac{\Delta_{E-DPCCH}}{20}\right)}$$

Thus, $\beta_{hs}$, $\beta_{ed}$, and $\beta_{ec}$, representing the transmit power of the HS-DPCCH, the E-DPCCH and the E-DPDCH, are set relative to $\beta_c$, only if $\beta_c$ exists.

For the stand-alone E-DCH, however, since the DCH is not established, a TFC is not set for the DCH either. As a result, $\beta_c$ and $\beta_d$ are not set and it is impossible to set the transmit power of the HS-DPCCH, the E-DPCCH and the E-DPDCH relative to $\beta_c$.

According to exemplary embodiments of the present invention, variables necessary for setting the transmit power of the uplink dedicated physical channels are set depending on whether the DCH exists or not. Since it is impossible to set the transmit power of the HS-DPCCH, the E-DPCCH and the E-DPDCH relative to $\beta_c$ in the case of the stand-alone E-DCH, $\beta_c$ is treated as a random constant. While the method in which $\beta_c$ can be set in determining gain factors for the E-DPDCH and the E-DPCCH in relation to the E-DCH is described in the following exemplary embodiments, it is to be appreciated that these embodiments are also applicable to the setting of gain factors for other uplink dedicated physical channels like the HS-DPCCH, without much modification.

Exemplary Embodiment 1

In a first exemplary embodiment, the present invention presents a method of setting the transmit power of dedicated physical channels in a different manner depending on whether the DCH is established or not with the E-DCH established already, that is, depending on whether the E-DCH is a stand-alone or not. In the presence of the DCH, the UE sets $\beta_c$ according to the TFC of the DCH set by the RNC. In the absence of the DCH, the UE sets $\beta_c$ to 1 or a predetermined constant.

Figure 6:
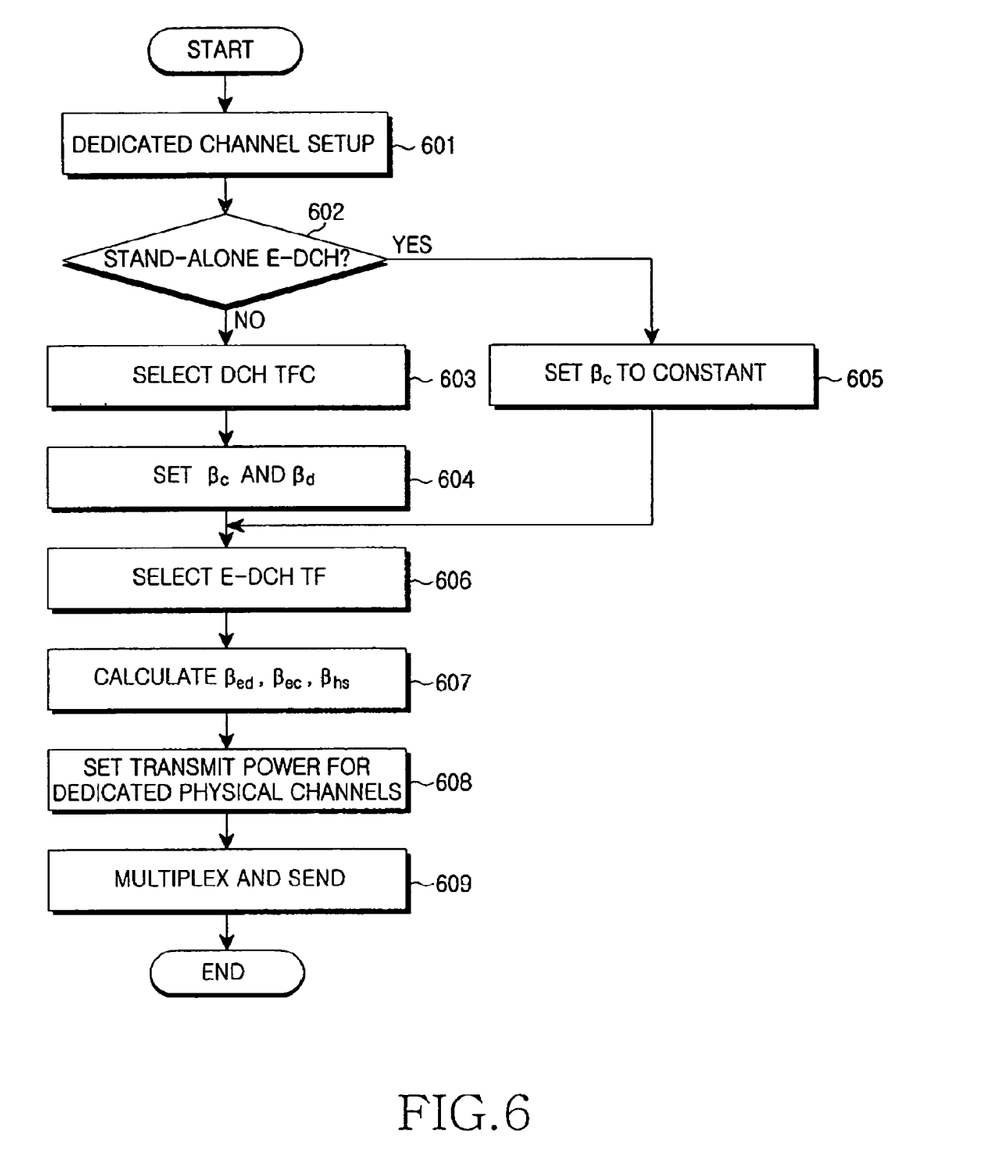
FIG. 6 is a flowchart illustrating an exemplary UE operation according to an embodiment of the present invention.

FIG. 6 is a flowchart illustrating an exemplary transmit power setting operation in the UE according to an embodiment of the present invention.

Referring to FIG. 6, the UE establishes dedicated channels including the E-DCH and/or the DCH in step 601. Simultaneously with establishing the dedicated channels according to channel configuration information signaled by the RNC, the UE determines whether the DCH and the DPDCH are configured by checking the existence of configuration information about the DCH and the DPDCH in the channel configuration information. In step 602, the UE determines whether the DCH has been established. If the DCH has been established (the E-DCH does not stand alone), the UE proceeds to step 603. In the case of a stand-alone E-DCH, the UE proceeds to step 605. The stand-alone E-DCH is an E-DCH without the DCH and the DPDCH established.

In step 603, the UE selects a TFC for the DCH. The TFC contains $\beta_c$ and $\beta_d$. The UE sets $\beta_c$ and $\beta_d$ for a current TTI in step 604. However, in the case of a stand-alone E-DCH the UE does not set a TFC for the DCH and sets $\beta_c$ to a constant (e.g. '1') in step 605.

After step 604 or step 605, the UE selects a TF for the E-DCH in step 606. The $\Delta_{E\text{-}DPDCH}$ and $\Delta_{E\text{-}DPCCH}$ are determined based on the TF of the E-DCH. The UE then calculates gain factors for the E-DPDCH and the E-DPCCH, $\beta_{ed}$ and $\beta_{ec}$, using $\beta_c$, $\Delta_{E\text{-}DPDCH}$, and $\Delta_{E\text{-}DPCCH}$ by using Equation (2) in step 607. If HSDPA is used, the UE additionally calculates $\beta_{hs}$ for the HS-DPCCH using $\beta_c$ and $\Delta_{HS\text{-}DPCCH}$ in step 607.

After acquiring the gain factors for all of the dedicated physical channels in step 607, the UE sets the transmit power of the dedicated physical channels using the gain factors in step 608, and then multiplexes the dedicated physical channels, prior to uplink transmission, in step 609.

Exemplary Embodiment 2

A second exemplary embodiment provides a method of changing DCH setting depending on whether an established E-DCH stands alone or not. In the case of the stand-alone E-DCH, the RNC sets a virtual DCH and signals $\beta_c$ for the virtual DCH. Since the DCH does not deliver data, the DPCCH and the DPDCH do not exist in the PHY layer.

The RNC informs the UE of a TFC Set (TFCS) available for the uplink DCH by channel configuration information. The UE selects one of the TFCs of the TFCS and sends data processed according to the selected TFC on the uplink DPDCH. The selected TFC is known to the Node B on the uplink DPCCH.

In the case of the stand-alone E-DCH, there is no data to be carried on the DCH. Thus, the RNC includes only one TFC for the virtual DCH in the TFCS. The one TFC indicates a transport block size of 0 and the non-inclusion of a Cyclic Redundancy Code (CRC), so that the DPDCH is not to be sent actually. Also, the number of codes for the DPDCH is set to 0 and a Spreading Factor (SF) is set to not be used in the channel configuration information. Due to the existence of only one TFC, no TFCI is set to be used. The channel configuration information contains $\beta_c$ for the virtual DCH.

Figure 7:
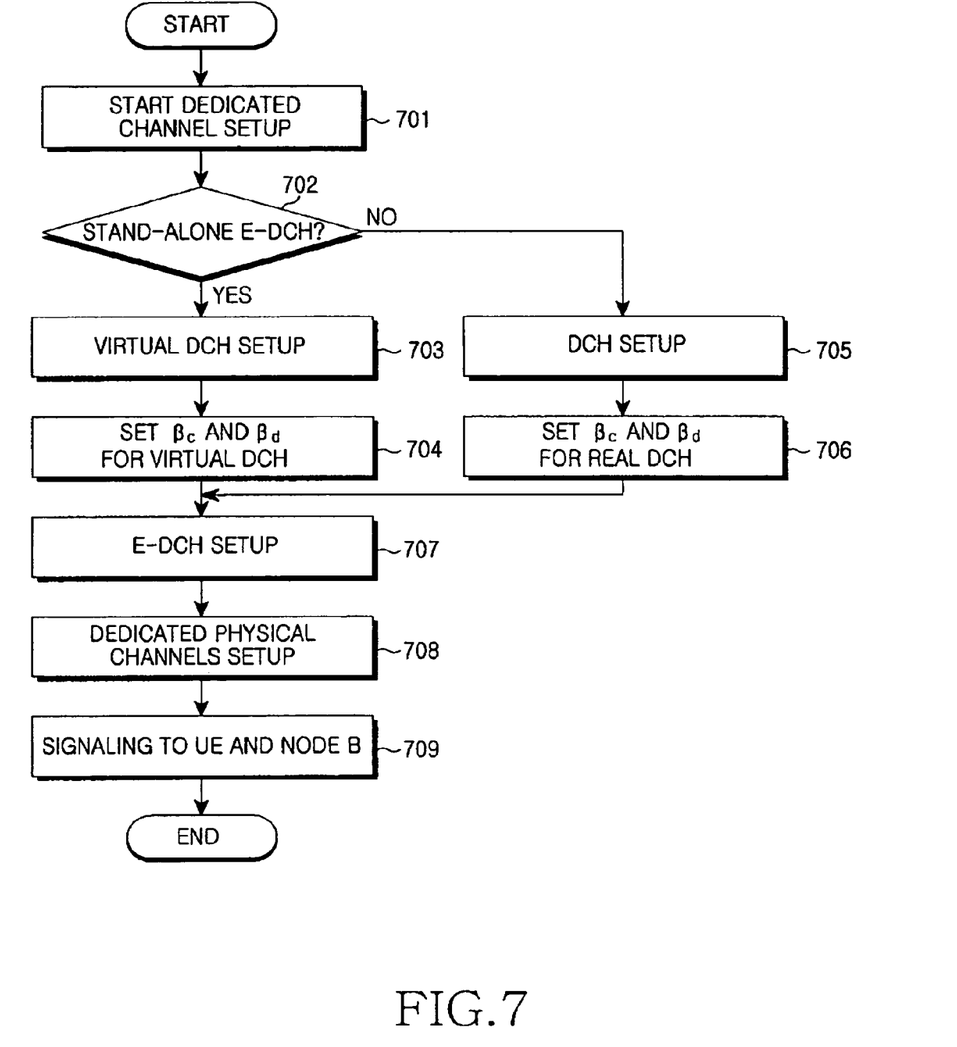
FIG. 7 is a flowchart illustrating an exemplary RNC operation according to another embodiment of the present invention.

FIG. 7 is a flowchart illustrating an exemplary channel configuration information setting operation in the RNC according to another embodiment of the present invention.

Referring to FIG. 7, the RNC determines whether to establish dedicated channels including the E-DCH and/or the DCH for the UE in step 701, and determines whether the E-DCH stands alone or not in step 702. If the E-DCH is not a stand-alone E-DCH, the RNC proceeds to step 705. In the case of the stand-alone E-DCH, the RNC goes to step 703. The stand-alone E-DCH is defined as an E-DCH without the DCH and the DPDCH established.

If the E-DCH is not a stand-alone E-DCH in step 702, DCH configuration is performed as done conventionally. That is, in step 705, the RNC sets DCH-related variables and a TFCS. The RNC then sets $\beta_c$ and $\beta_d$ for each TFC included in the TFCS in step 706.

However, in the case of the stand-alone E-DCH, a virtual DCH is configured. That is, the RNC sets one TFC for the virtual DCH in transport channel configuration information about the DCH in step 703. The TFC indicates a transport block size of 0, and $\beta_c$ and $\beta_d$ are included for the TFC in the transport channel configuration information. The $\beta_c$ is set to a random constant, for example '1'.

After step 704 or step 706, the RNC sets transport channel configuration information including a TF for the E-DCH in step 707, and sets physical channel configuration information required for establishing dedicated physical channels in the UE in step 708. The RNC sets the number of codes for the DPDCH to which the DCH is mapped to 0, and sets an SF to not be used in step 708. In step 709, the RNC signals the transport and physical channel configuration information to the UE and the Node B.

Figure 8:
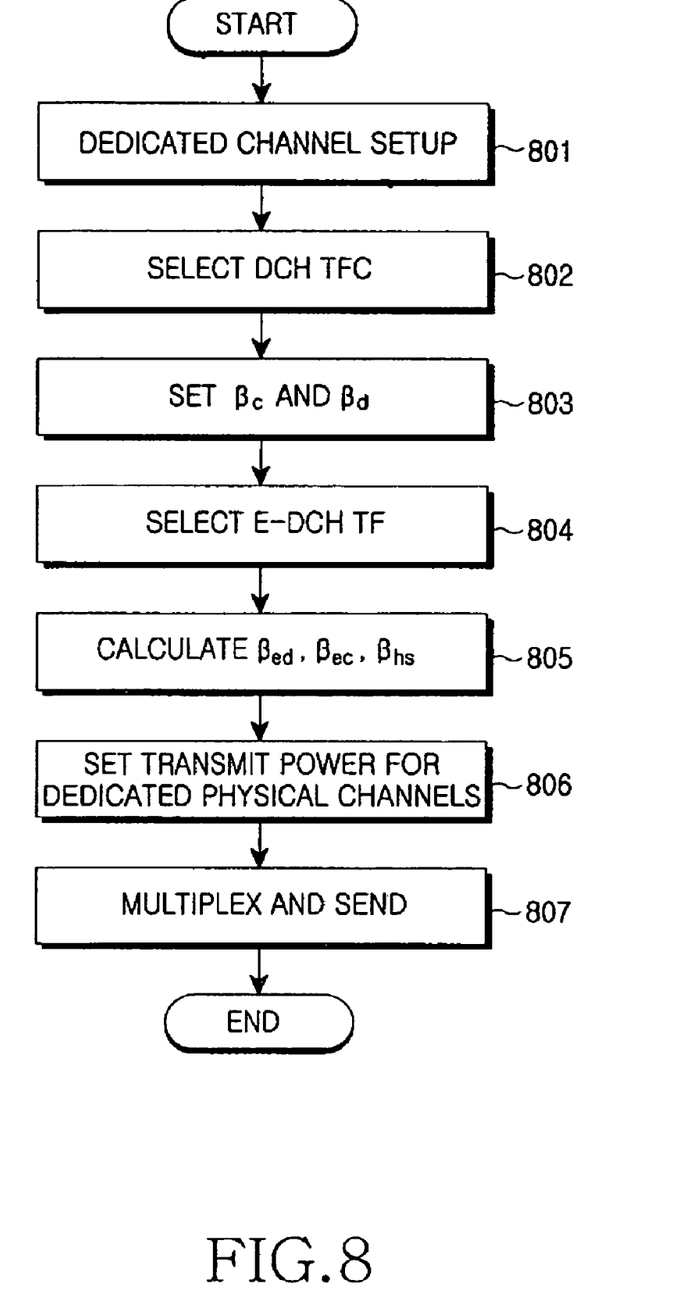
FIG. 8 is a flowchart illustrating an exemplary UE operation according to the second embodiment of the present invention.

FIG. 8 is a flowchart illustrating an exemplary transmit power setting operation in the UE according to the second exemplary embodiment of the present invention. The UE characteristically operates irrespective of whether the E-DCH is a stand-alone one or not.

Referring to FIG. 8, the UE receives channel configuration information about dedicated channels from the RNC in step 801, and selects a TFC for the DCH referring to the channel configuration information in step 802. In the case of a stand-alone E-DCH, only one TFC exists for the DCH in the channel configuration information. Therefore, the UE selects the only one TFC for the DCH. In step 803, the UE acquires $\beta_c$ and $\beta_d$ in correspondence with the TFC.

In step 804, the UE selects a TF for the E-DCH referring to a TFCS available for the E-DCH, and sets $\Delta_{E\text{-}DPDCH}$ and $\Delta_{E\text{-}DPCCH}$ according to the TF of the E-DCH. The UE then calculates gain factors for the E-DPDCH and the E-DPCCH, $\beta_{ed}$ and $\beta_{ec}$, using $\beta_c$, $\Delta_{E\text{-}DPDCH}$, and $\Delta_{E\text{-}DPCCH}$ by using Equation (2) in step 805. If HSDPA is used, the UE additionally calculates $\beta_{hs}$ for the HS-DPCCH using $\beta_c$ and $\Delta_{HS\text{-}DPCCH}$ in step 805.

After acquiring the gain factors for all of the dedicated physical channels in step 805, the UE sets the transmit power of the dedicated physical channels using the gain factors in step 806, and then multiplexes the dedicated physical channels, prior to uplink transmission in step 807.

As described above, if the E-DCH is a stand-alone E-DCH, the transmit power of dedicated physical channels can be set normally without receiving a gain factor for the DCH from the RNC in one exemplary embodiment of the present invention. In another exemplary embodiment, the UE operates in the same manner, irrespective of whether the E-DCH is a stand-alone E-DCH or not, and the stand-alone E-DCH is supported only by setting in the RNC.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of setting a transmission power, by a User Equipment (UE), for uplink transmission in a mobile communication system, comprising the steps of:
   receiving uplink dedicated physical channel information;
   determining from the information whether a target configuration has at least one dedicated physical data channel (DPDCH) or not;
   setting a first gain factor to a predetermined constant, if the target configuration has no DPDCH;
   calculating a second gain factor based on the first gain factor; and
   setting the transmission power of a uplink channel using the second gain factor.

2. The method of claim 1, wherein the predetermined constant is 1, and the uplink channel is any one channel of an enhanced dedicated physical data channel (E-DPDCH) an enhanced dedicated physical control channel (E-DPCCH), and a high speed dedicated physical control channel (HS-DPCCH).

3. The method of claim 1, wherein the calculation step comprises calculating the second gain factor using the first gain factor and an offset value for the uplink channel $$\beta_{ed} = \beta_c \times 10^{\left(\frac{\Delta_{E-DPDCH}}{20}\right)}.$$

4. The method of claim 3, wherein the offset value for the uplink channel is received from a Node B to the UE, and the offset value is any one of $\Delta_{E\text{-}DPDCH}$, $\Delta_{E\text{-}DPCCH}$, and $\Delta_{HS\text{-}DPCCH}$.

5. The method of claim 4, wherein the data of the uplink channel is spread by spreading code for corresponding the uplink channel and the transmit power of the data is set by using the second gain factor.

6. An apparatus for receiving and transmitting data in a mobile communication system, comprising:
   a transceiver unit for receiving data from a Node B and transmitting data to a Node B; and
   a control unit for controlling the operations to receive uplink dedicated physical channel information, determine from the information whether a target configuration has at least one dedicated physical data channel (DPDCH) or not, set a first gain factor to a predetermined constant, if the target configuration has no DPDCH, calculate a second gain factor based on the first gain factor, and set the transmission power of a uplink channel using the second gain factor.

7. The apparatus of claim 6, wherein the predetermined constant is 1, and the uplink channel is any one channel of an enhanced dedicated physical data channel (E-DPDCH), an enhanced dedicated physical control channel (E-DPCCH), and a high speed dedicated physical control channel (HS-DPCCH).

8. The apparatus of claim 7, wherein the control unit is configured to calculate the second gain factor using the first gain factor and an offset value for the uplink channel $$\beta_{ec} = \beta_c \times 10^{\left(\frac{\Delta_{E-DPCCH}}{20}\right)}.$$

9. The apparatus of claim 8, wherein the offset value for the uplink channel is received from a Node B to the UE, and the offset value is any one of $\Delta_{E\text{-}DPDCH}$, $\Delta_{E\text{-}DPCCH}$, and $\Delta_{HS\text{-}DPCCH}$.

10. The apparatus of claim 9, wherein the data of the uplink channel is spread by spreading code for corresponding the uplink channel and the transmit power of the data is set by using the second gain factor.

11. A method of operating for setting an uplink transmission power of a User Equipment (UE) in a mobile communication system, comprising the steps of:
    transmitting uplink dedicated physical channel information which a target configuration has at least one dedicated physical data channel (DPDCH) or not; and
    receiving from the UE data set by the transmission power calculated based on the target configuration,
    wherein if the target configuration has no DPDCH, a first gain factor is set by a predetermined constant, a second gain factor is calculated based on the first gain factor, and the transmission power of an uplink channel for the UE is set by using the second gain factor.

12. The method of claim 11, wherein the predetermined constant is 1, and the uplink channel is any one channel of an enhanced dedicated physical data channel (E-DPDCH), an enhanced dedicated physical control channel (E-DPCCH), and a high speed dedicated physical control channel (HS-DPCCH).

13. The method of claim 12, wherein the second gain factor is calculated based on the first gain factor and an offset value for the uplink channel.

14. The method of claim 13, wherein the offset value for the uplink channel is received from a Node B to the UE, and the offset value is any one of $\Delta_{E\text{-}DPDCH}$, $\Delta_{E\text{-}DPCCH}$, and $\Delta_{HS\text{-}DPCCH}$.

15. The method of claim 14, wherein the data of the uplink channel is spread by spreading code for corresponding the uplink channel and the transmit power of the data is set by using the second gain factor.

16. An apparatus of operating for setting an uplink transmission power of a User Equipment (UE) in a mobile communication system, comprising the steps of:
    a transceiver unit for receiving data from a UE and transmitting data to a UE;
    a control unit for controlling the operations to transmit uplink dedicated physical channel information which a target configuration has at least one dedicated physical data channel (DPDCH) or not, and receive from the UE data set by the transmission power calculated based on the target configuration,
    wherein if the target configuration has no DPDCH, a first gain factor is set by a predetermined constant, a second gain factor is calculated based on the first gain factor; and the transmission power of a uplink channel for the UE is set by using the second gain factor.

17. The apparatus of claim 16, wherein the predetermined constant is 1, and the uplink channel is any one channel of an enhanced dedicated physical data channel (E-DPDCH), an enhanced dedicated physical control channel (E-DPCCH), and a high speed dedicated physical control channel (HS-DPCCH).

18. The method of claim 17, wherein the second gain factor is calculated based on the first gain factor and an offset value for the uplink channel.

19. The apparatus of claim 18, wherein the offset value for the uplink channel is received from a Node B to the UE, and the offset value is any one of $\Delta_{E\text{-}DPDCH}$, $\Delta_{E\text{-}DPCCH}$, and $\Delta_{HS\text{-}DPCCH}$.

20. The apparatus of claim 19, wherein the data of the uplink channel is spread by spreading code for corresponding the uplink channel and the transmit power of the data is set by using the second gain factor.

* * * * *